Oct. 12, 1954  H. G. CAROLAND  2,691,309
CASTING REEL HANDLE
Filed Aug. 14, 1953

Horace G. Caroland
INVENTOR.

Patented Oct. 12, 1954

2,691,309

UNITED STATES PATENT OFFICE 2,691,309

CASTING REEL HANDLE

Horace G. Caroland, Hobart, Okla.

Application August 14, 1953, Serial No. 374,275

3 Claims. (Cl. 74—545)

The present invention relates to new and useful improvements in handles for fishing reels and has for its primary object to reduce the liability of back lash in the line and to provide smoother and greater casting distance.

A further object is to provide a fly wheel type construction for the handle and embodying centrifugally actuated means to automatically regulate the speed of rotation of the reel shaft in accordance with the velocity of the cast.

Another object is to provide a device of this character of suitable and practical construction, which is efficient and reliable in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
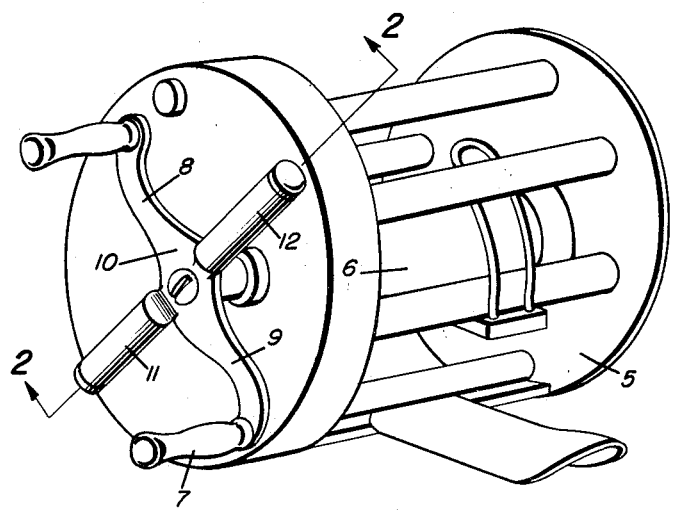
Figure 1 is a perspective view.
Figure 2:
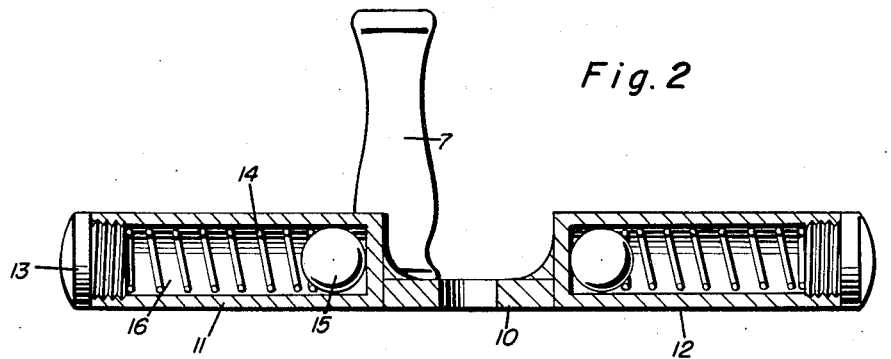
Figure 2 is an enlarged sectional view taken on a line 2—2 of Figure 1.

Referring now to the drawing in detail, wherein for the purpose of illustration I have disclosed a preferred embodiment of my invention, the numeral 5 designates a conventional type of fishing reel which includes a shaft 6 and to one end of which the handle 7 is secured. The handle is constructed of a pair of arms 8 and 9 projecting radially from diametrically opposed sides of the hub portion 10 of the handle.

A pair of tubular members 11 and 12 are preferably integrally formed with the handle or may be soldered or otherwise suitably secured thereto and also extend radially from diametrically opposed sides of the hub portion 10 and at 90° with respect to the arms 8 and 9.

The tubular members are closed at their inner ends and the outer end of each tubular member is closed by a threaded plug 13 to seal a liquid 14 in said members. A ball 15 is placed in the inner end of each member and a coil spring 16 is also placed therein between the ball and plug.

The balls constitute counter-weights for the handle and respond to centrifugal action when casting the fishing line in accordance with the velocity thereof to produce a smoother operation of the handle and reel. The liquid in the tubes slows the movement of the balls to a gradual return inwardly of the tubes as the velocity of the line decreases.

What I claim is:

1. A fishing reel handle including a hub portion having a crank handle extending radially therefrom, a pair of tubular members extending radially at diametrically opposite sides of the hub portion, a weight slidably mounted in each of said members, and spring means opposing outward movement of the weights.

2. A fishing reel handle including a hub portion, a pair of tubular members extending radially at diametrically opposite sides of the hub portion, a weight slidably mounted in each of said members, spring means opposing outward movement of the weights, and liquid in said members opposing movement of the weights in either an inward or outward direction.

3. A fishing reel handle including a hub portion having a pair of crank handles extending radially from the hub at diametrically opposite sides of the latter, a pair of elongated members extending radially at diametrically opposite sides of the hub portion and positioned at 90° with respect to the crank handles, centrifugally responsive means carried by said elongated members and movable inwardly and outwardly thereof, and spring means opposing outward movement of said centrifugal means.

References Cited in the file of this patent

UNITED STATES PATENTS

| Number | Name | Date |
|---|---|---|
| 470,178 | Byllesby | Mar. 8, 1892 |
| 997,851 | Rempe | July 11, 1911 |
| 1,386,366 | Robertson | Aug. 2, 1921 |